Jan. 10, 1933.  L. LEVY  1,893,779
SUPERHETERODYNE RECEIVING SYSTEM
Filed Oct. 3, 1927
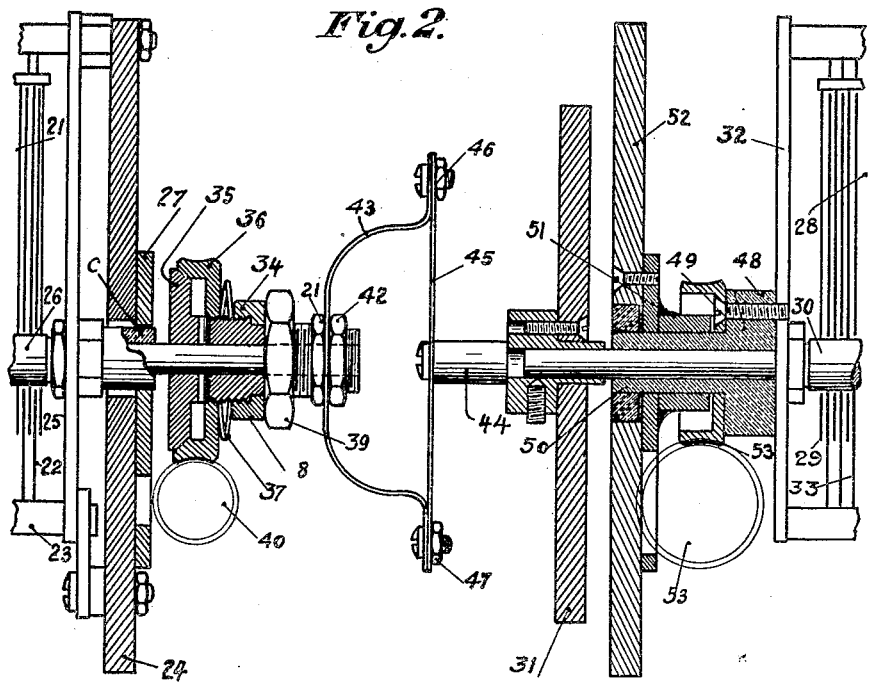
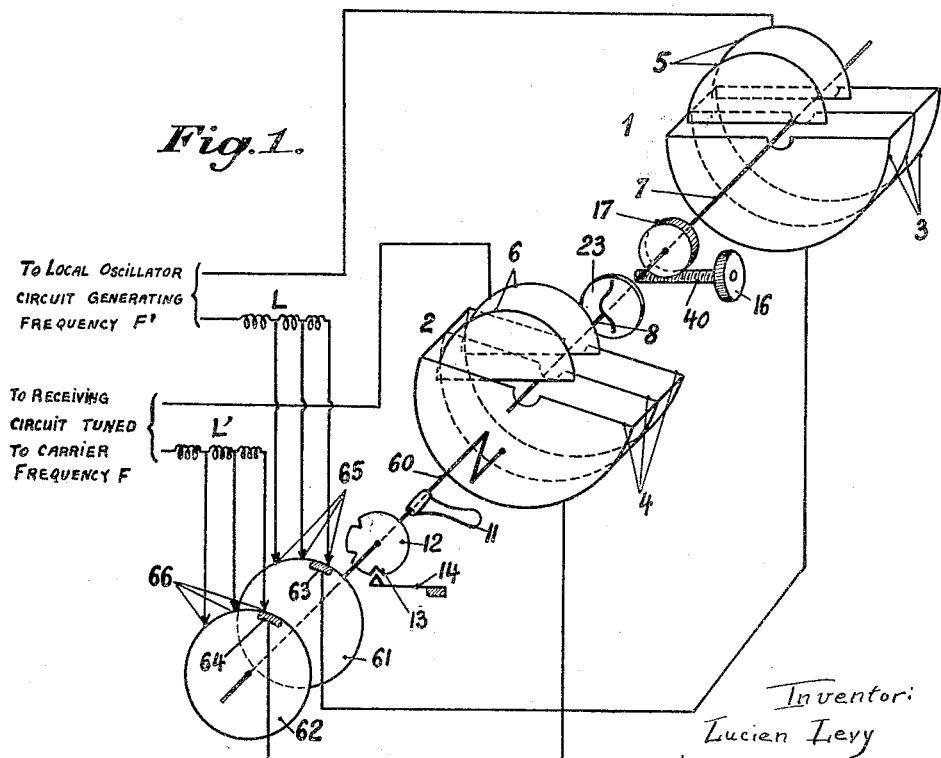

UNITED STATES PATENT OFFICE

LUCIEN LEVY, OF PARIS, FRANCE

SUPERHETERODYNE RECEIVING SYSTEM

Application filed October 3, 1927, Serial No. 223,761, and in France October 13, 1926.

It is known that in a receiver set of the superheterodyne type there are two adjustable oscillating circuits, the first one being connected or coupled with the aerial, and the second one comprising that in which oscillations are locally generated. These two circuits are tuned, the first one at the frequency F of the incoming waves, the second at a frequency F' and in such manner that the difference $F-F'$ always remains equal to a predetermined value $f$, often termed the secondary frequency. As a consequence, it is obvious that, for receiving signals of a certain wave length, two operations are necessary, the first comprising tuning the first circuit to the frequency F of such signals, and the second one comprising tuning the second circuit to the frequency $F-f$ (or $F+f$).

It is also known that to simplify said operations, circuits should be used, each comprising an inductance coil and a straight line frequency condenser, the coils having the same self inductance, and the condensers being identical, their rotors being interlocked. For instance, they may be mounted on the same shaft in such manner that they always rotate in the same angular relation with each other, although the angular relation between the rotor and the stator is different for each of said condensers. Thus, if $d$ is the angle between the rotor and stator of the first condenser, and $d'$ the same angle in the second condenser, $d$ and $d'$ are different. However, when the rotors are rotated, $d-d'$ remains constant.

Under such conditions, it is known that the natural frequencies F and F' of the circuits may be varied, the difference $F-F'$ remaining constant and equal to a predetermined value $f$, this latter frequency $f$ depending in particular on the difference $d-d'$, or, in other terms, on the difference of the angular variation between the rotor and stator in the two condensers.

It is also well known that an oscillating circuit comprising an inductance coil and an adjustable condenser can be tuned only to a frequency included in a certain range and not to all the frequencies used in broadcasting. Under such conditions, in order to receive one range of frequency or another, it is known to modify the inductance of the circuit either by interchanging the inductance coils, or by adding one or more coils to the first one.

In the above described device, said proceeding presents a very serious drawback: if the self inductance of the coils of the two oscillating circuits is changed to another value, then when the condensers are rotated, the difference of the natural frequencies of both circuits will remain constant and equal to a value $f'$ different from the value $f$ it had when the inductions were equal to L instead of L'.

Now, it is well known that one of the chief advantages of the superheterodyne receiver is that it maintains the same value for the secondary frequency, regardless of the frequency of the incoming waves.

The object of the invention is to avoid the above indicated drawback by changing the difference between the angular variation of the rotor and of the stator in both condensers, simultaneously with changes in the inductances of both circuits to maintain always the same value $f$ for the secondary frequency.

This can be done more particularly by rotating the stator of one of the condensers through a predetermined angle when the inductances are changed.

I have described hereinbelow and shown on appended drawings, by way of example, three forms of execution of my invention.

Figure 1 is a diagram showing the arrangement of elements according to the invention.

Figure 2 is a vertical schematic section of a practical example of the invention.

In the local oscillator circuit, are inserted in series a condenser 1 and inductance coils L, while in the receiving circuit, are inserted in series the condenser 2 and the inductance coils L'. The remainder of the set, comprising more particularly the aerial, the means for creating and selecting the beats, etc., has not been shown since such features are well known and do not comprise part of the present invention. The two condensers 1 and 2 are of the known type called straight line frequency condensers; they are each constituted by a stator (3 or 4) and a rotor (5 or 6), each consisting of a series of parallel plates of suitable form, the plate of the rotors being disposed so that they can move between those of the stators.

The two rotors 5 and 6 are mounted on alined spindles 7 and 8, connected to each other by a yielding device 23, the object of which being to allow the working of the two condensers even if the two spindles 7 and 8 are not perfectly alined; to permit an accurate adjustment of both rotors, the spindle 7 is keyed to a wormwheel 17 meshing with a screw 40 which may be rotated by means of the knob 16.

According to the invention, the angular displacement between the stator and the rotor should be varied when the inductances are modified; for that purpose, the stator 3 is stationary whereas the stator 4 can rotate around the same axis as the rotors; said rotation can be made, as represented on Fig. 1, by means of a handle 11 fastened on a shaft 60.

As the rotation of the stator 4 must be made at the same time as the inductances are changed, it is obviously desirable to control the two operations by the same means; this is done by actuating the switches varying the inductances by the shaft 60. On Fig. 1, these switches are represented as two discs 61 and 62 formed in insulating matter, and on the periphery of which rub brushes 65 and 66, connected with the different inductance coils L and L'. The discs are provided with metallic parts 63, 64 each connected with one of the stators 3 and 4. It is obvious that, by rotating the shaft 60 and consequently the discs 61 and 62, we will put in each circuit, one, two, or three of the inductance coils L and L' according to the brush with which the metallic parts 63 and 64 are in contact.

It is also necessary, for the proper operation of the apparatus, to give to the stator 4 three accurately determined positions, each corresponding to the insertion of one, two or three inductance coils in the circuits.

For that purpose, on the shaft 60 a disc 12 is keyed, in the periphery of which three notches 13 have been provided; a knife, borne by the spring 14, engages said notches. The angular positions of stator 4, notches 13 and metallic parts 63, 64 are determined with reference to each other in such manner that, when the knife is engaged in the bottom of one of the notches 13, the metallic parts 63, 64 are in contact with one of the brushes 65, 66 and the stator 4 has turned exactly through the angle for which the differences of the frequencies F' and F of the local oscillations circuit and of the receiving circuit is equal to the predetermined value $f$.

It is now easy to understand the working of the device.

Let us assume that we must receive waves of a frequency F belonging to the range for which the inductances must be the highest, in other terms for which the three coils L' must be connected in the receiving circuit. We begin by actuating the handle 11 so that the metallic parts are in the position represented on Fig. 1; doing so, we have at the same time rotated the stator 4 through such angle that its angular movement with reference to the rotor 6 is such that the difference between the natural frequencies F and F' of the receiving and of the local oscillations circuits, is equal to the predetermined frequency $f$. We then actuate the knob 16 to rotate simultaneously the rotors 5 and 6 till the exact adjustment is found for which the frequency of the receiving circuit is F; the frequency F' of the local oscillator is then equal to $F-f$, and we are thus in the required conditions for the reception.

Fig. 1 is merely a diagram for the explanation of the underlying features of the invention; on Fig. 2, is represented a form of execution of the interlocking and adjusting devices of the two condensers.

According to Figure 2 the variable condenser 21 is constituted by the stationary plates 22 secured to the uprights 23 borne by the flange 24. Its movable plates 25 are keyed to the spindle 26 secured between the metallic flanges 27. The other variable condenser 28 also comprises movable plates 29 keyed to a spindle 30 borne by the flange 31. Around this spindle 30 are built the end flanges 32 of the stator, bearing stationary plates 33.

A sleeve 34 is keyed on the spindle 26 and its end forms the male end 35 of a conical coupling. The female part 36 of this coupling is mounted loosely on the sleeve 34 and is pressed against part 34 by spring washers 37 the adjustment of which is provided by the nut 38 and safety nut 39. The outer surface of the female conical part 36 forms a pinion meshing with the worm 40 bearing the control knob not shown. On the threaded end of the sleeve 34 passing over the spindle 16 is secured, through the nuts 41, 42 a yielding clip 43.

At the end of the spindle 30 of the other rotor which is set as exactly as possible in alignment with the other is secured a yielding metal disc 45 to the edge of which are secured the ends of the clip 43 by means of screws and nuts 46, 47.

To the end flange 32 of the adjustable stator is secured, preferably through screws 49, a sleeve 48 fitted over the end of the spindle 30 of its rotor.

The end 50 of this sleeve 48 engages a socket 51 secured by its edge to a flange 52 whereby it serves as a bearing for the adjustable stator. The sleeve 48 is provided with a bell shaped extension formed as a pinion meshing with a worm 54 to which is secured the knob, not shown, used for adjusting the stator.

The advantages of this arrangement are the following:

When the knob controlling the two rotors is pushed too far and the rotor plates arrive at the end of their path, it is impossible even by employing force on the knobs to damage the variable condensers due to the sliding connection between the knob and the spindles of the rotors. The yielding connection between the two spindles permits them to move simultaneously without any exaggerated friction even if the two spindles are not exactly in alignment with each other as is generally the case in practice. It is also possible when the adjustable stator is brought into the predetermined position corresponding to a given range of wavelengths, to modify this position slightly by a further adjustment as required in practice for obtaining the best results. The symmetrical arrangement of the two control knobs between the two variable condensers provides a symmetrical and handy receiver.

What I claim is:

1. In a superheterodyne receiver comprising a receiving circuit and a local oscillations generating circuit, the difference between the proper frequencies of which must always keep the same value, the combination of variable inductances in each of said circuits, means for varying said inductances so that they always remain equal to each other, straight line frequency condensers in each of said circuits, means for simultaneously moving the rotors of said condensers, and means for varying the angular relation between the stator and the rotor of one of said condensers when varying the common value of the inductances, to always keep a constant difference between the frequencies of the receiving circuit and of the local oscillations generating circuit.

2. In a superheterodyne receiver comprising a receiving circuit and a local oscillations generating circuit, the difference between the proper frequencies of which must always keep the same value, the combination of two series of substantially equal inductance coils adapted to be selectively inserted in said circuits, a switch adapted to insert the desired arrangement of equal inductance coils in each circuit, means to actuate said switch in order to change the common value of the inductance, straight line frequency condensers in each of said circuits, and means for simultaneously moving the rotors of said condensers, means for varying the angular relation between the stator and the rotor of one of the said condensers when varying the common value of the inductances in order to always keep a constant difference between the frequencies of the receiving circuit and of the local oscillations generating circuit.

3. In a superheterodyne receiver comprising a receiving circuit and a local oscillations generating circuit, the difference between the proper frequencies of which must always keep the same value, the combination of two series of equal inductance coils adapted to be selectively inserted in said circuits, a switch adapted to insert the desired arrangement of equal inductance coils in each circuit, means to actuate said switch in order to change the common value of the inductance, straight line frequency condensers in each of said circuits, two alined shafts for the rotors of said condensers, yielding means for connecting said shafts together, a knob actuating one of said shafts, and means for varying the angular relation between the stator and the rotor of one of the said condensers when varying the common value of the inductances to always keep a constant difference between the frequencies of the receiving circuit and of the local oscillations generating circuit.

4. In a superheterodyne set comprising a receiving circuit and a local oscillations generating circuit, the difference between the proper frequencies of which must always keep the same value, the combination of two series of equal inductance coils adapted to be inserted in said circuits, a switch adapted to insert the desired arrangement of equal inductance coils in each circuit, means to actuate said switch in order to change the common value of the inductance, straight line frequency condensers in each of said circuits, two alined shafts for the rotors of said condensers, yielding means for connecting said shafts together, a common knob actuating one of said shafts, and a control part for causing the stator of one of the condensers to turn around the shaft of the rotor, whereby the angular relation of said rotor and stator may be varied when varying the common value of the inductances to always keep a constant difference between the frequencies of the receiving circuit and of the local oscillations generating circuit.

5. In a superheterodyne set comprising a receiving circuit and a local oscillations generating circuit, the difference between the proper frequencies of which must always keep the same value, the combination of two series of equal inductance coils adapted to be inserted in said circuits, a switch adapted to insert the desired arrangement of equal inductance coils in each circuit, two alined shafts for the rotors of said condensers, yielding means for connecting said shafts together, a knob actuating one of said shafts, a control part for causing the stator of one of the condensers to turn around the shaft of the rotor whereby the angular relation of said rotor and stator may be varied when varying the common value of the inductances, and means for actuating by the rotation of said stator the switch of the inductance coils to always keep a constant difference between the frequencies of the receiving circuit and of the local oscillations generating circuit.

In testimony whereof I have signed my name to this specification.

LUCIEN LEVY.